US012317033B2

(12) United States Patent
Yokoi et al.

(10) Patent No.: US 12,317,033 B2
(45) Date of Patent: May 27, 2025

(54) PIEZOELECTRIC VIBRATION PLATE AND PIEZOELECTRIC SOUND GENERATING COMPONENT

(71) Applicant: Murata Manufacturing Co., Ltd., Nagaokakyo (JP)

(72) Inventors: Yuko Yokoi, Nagaokakyo (JP); Tadashi Okuzawa, Nagaokakyo (JP); Toshiyuki Sakai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 807 days.

(21) Appl. No.: 17/575,042

(22) Filed: Jan. 13, 2022

(65) Prior Publication Data

US 2022/0141594 A1 May 5, 2022

Related U.S. Application Data

(63) Continuation of application No. PCT/JP2020/019117, filed on May 13, 2020.

(30) Foreign Application Priority Data

Aug. 22, 2019 (JP) ................................ 2019-151732

(51) Int. Cl.
*H04R 17/00* (2006.01)
*H04R 7/18* (2006.01)

(52) U.S. Cl.
CPC ............... *H04R 17/00* (2013.01); *H04R 7/18* (2013.01)

(58) Field of Classification Search
CPC ........ H04R 17/00; H04R 17/005; H04R 7/18; H04R 7/20; H04R 1/06; H04R 2400/00; G10K 9/122
See application file for complete search history.

(56) References Cited

U.S. PATENT DOCUMENTS 9,253,578 B2 2/2016 Konno et al.
10,250,995 B2 * 4/2019 Doshida .............. H04R 1/1008
(Continued)

FOREIGN PATENT DOCUMENTS

CN 1422102 A 6/2003
JP H11355892 A 12/1999
(Continued)

OTHER PUBLICATIONS

International Search Report issued for PCT/JP2020/019117, date of mailing Aug. 4, 2020.
(Continued)

*Primary Examiner* — Emily P Pham
(74) *Attorney, Agent, or Firm* — ArentFox Schiff LLP

(57) ABSTRACT

A piezoelectric vibration plate includes a base that includes a central portion and a circumferential portion and has conductivity. A piezoelectric portion is provided on the central portion that performs bending vibration in a manner to reciprocate between both sides in a thickness direction of the base when a voltage is applied to the piezoelectric portion. The base includes at least one penetration portion positioned between the central portion and the circumferential portion, and at least one coupling portion that couples the central portion to the circumferential portion. The at least one coupling portion is arranged on a farthest position from a center, at which maximum displacement is generated in the bending vibration, of the central portion.

20 Claims, 13 Drawing Sheets

(56) References Cited

U.S. PATENT DOCUMENTS

| | | | |
|---|---|---|---|
| 11,064,299 | B2 | 7/2021 | Murakami et al. |
| 2003/0099371 | A1 | 5/2003 | Ogura et al. |
| 2014/0153750 | A1 | 6/2014 | Konno et al. |
| 2019/0349687 | A1 | 11/2019 | Murakami et al. |

FOREIGN PATENT DOCUMENTS

| | | | |
|---|---|---|---|
| JP | 2006287968 | A | 10/2006 |
| JP | 2018007199 | A | 1/2018 |
| WO | 2013042316 | A1 | 3/2013 |

OTHER PUBLICATIONS

Written Opinion of the International Search Report issued for PCT/JP2020/019117, date of mailing Aug. 4, 2020.

* cited by examiner

PIEZOELECTRIC VIBRATION PLATE AND PIEZOELECTRIC SOUND GENERATING COMPONENT

CROSS REFERENCE TO RELATED APPLICATIONS

The present application is a continuation of PCT/JP2020/019117 filed May 13, 2020, which claims priority to Japanese Patent Application No. 2019-151732, filed Aug. 22, 2019, the entire contents of each of which are incorporated herein by reference.

TECHNICAL FIELD

The present invention relates to a piezoelectric vibration plate and a piezoelectric sound generating component.

BACKGROUND

Piezoelectric sound generating components are widely used as a piezoelectric buzzer or a piezoelectric receiver that generates an alarm sound or an operation sound, in electronic devices, home appliances, mobile phones, and the like. Such a piezoelectric sound generating component is required to have favorable acoustic conversion efficiency.

For example, Japanese Unexamined Patent Application Publication No. 11-355892 (hereinafter "Patent Document 1") discloses a piezoelectric vibration plate in which a vibration plate is formed by electrically and mechanically bonding a rectangular piezoelectric plate on a metallic plate face to face. Moreover, a slit is formed to surround a region in which the piezoelectric plate is bonded to the metallic plate. Also in the piezoelectric vibration plate, four coupling portions that couple a portion surrounded by the slit with a portion on the outside of the slit are formed on equally-distant positions from both end portions in the length direction of the portion surrounded by the slit. The coupling portions are provided on positions approximately ⅙ of the length from the both end portions in the length direction of the portion surrounded by the slit.

In addition, Japanese Unexamined Patent Application Publication No. 2006-287968 (hereinafter "Patent Document 2") discloses a piezoelectric speaker that includes: piezoelectric materials; and a metallic vibration plate attached to a frame body and provided with a vibration plate portion for constituting a piezoelectric vibrator together with the piezoelectric materials. Moreover, an elastic supporter is provided for elastically supporting the vibration plate portion. In the piezoelectric speaker, a damper material is loaded between the vibration plate portion of the metallic vibration plate and the frame body and the damper material is formed of a portion of polymer films stuck to the metallic vibration plate.

In the piezoelectric vibration plate of Patent Document 1, the coupling portions are formed on relatively close positions to the center of vibration, and, therefore, the vibration plate sometimes cannot be sufficiently displaced, making it impossible to obtain favorable acoustic conversion efficiency. Further, in the piezoelectric speaker of Patent Document 2, a plurality of slit-like holes formed on an outer edge portion of the vibration plate portion and on a flexure arm portion are filled with the damper material to flatten frequency characteristics and reduce distortion components. However, according to the configuration of Patent Document 2, the damper material can absorb bending vibration of the vibration plate portion. As a result, displacement of the vibration plate portion is sometimes lessened, degrading acoustic conversion efficiency.

SUMMARY OF THE INVENTION

Accordingly, it is an object of the present invention to provide a piezoelectric vibration plate and a piezoelectric sound generating component that obtain favorable acoustic conversion efficiency.

In an exemplary aspect, a piezoelectric vibration plate is provided that includes a base that includes a central portion and a circumferential portion and has conductivity. The circumferential portion is positioned on a periphery of the central portion. Moreover, a piezoelectric portion is provided on the central portion. The central portion performs bending vibration in a manner to reciprocate between both sides in a thickness direction of the base when a voltage is applied to the piezoelectric portion. The base includes at least one penetration portion which is positioned between the central portion and the circumferential portion, and at least one coupling portion which couples the central portion to the circumferential portion. The at least one coupling portion is arranged on a farthest position from a center, at which maximum displacement is generated in the bending vibration, of the central portion of the base portion.

According to the exemplary aspect of the present invention, a piezoelectric vibration plate and a piezoelectric sound generating component are provided that are constructed to obtain favorable acoustic conversion efficiency.

DETAILED DESCRIPTION OF EMBODIMENTS

Figure 1:
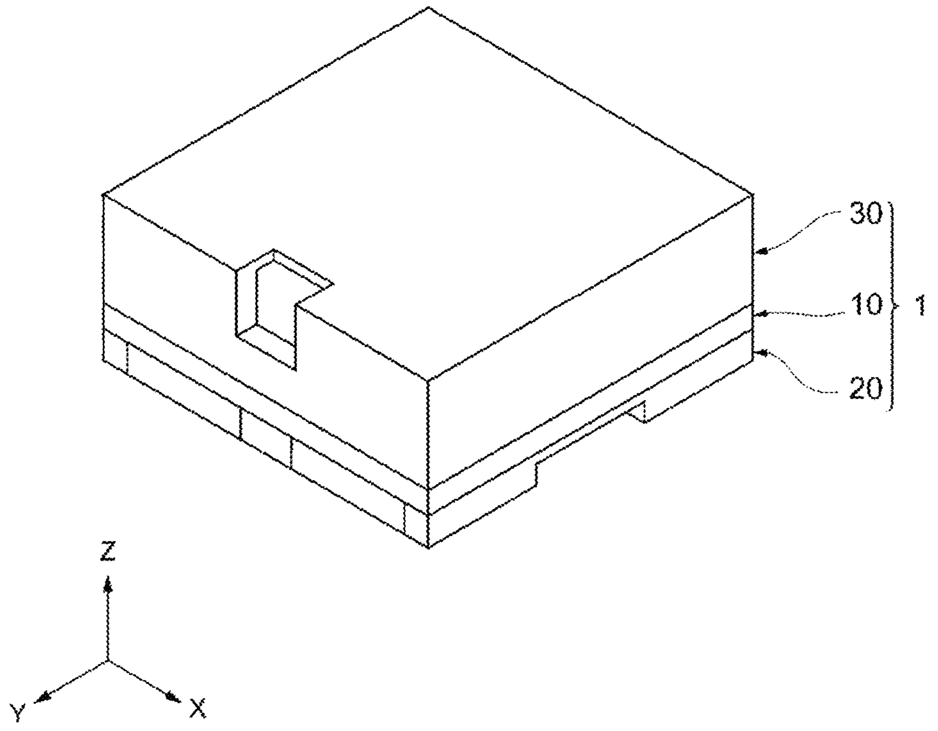
FIG. 1 is an overall view of a piezoelectric sound generating component according to a first exemplary embodiment.

Exemplary embodiments of the present invention will be described below. In the following description of drawings, the same or similar components are denoted by the same or similar reference characters. The drawings are examples, and the dimensions and shapes of respective components are schematic, and the technical scope of the present invention should not be limitedly interpreted to the embodiments.

First Exemplary Embodiment

<Piezoelectric Sound Generating Component 1>

Figure 2:
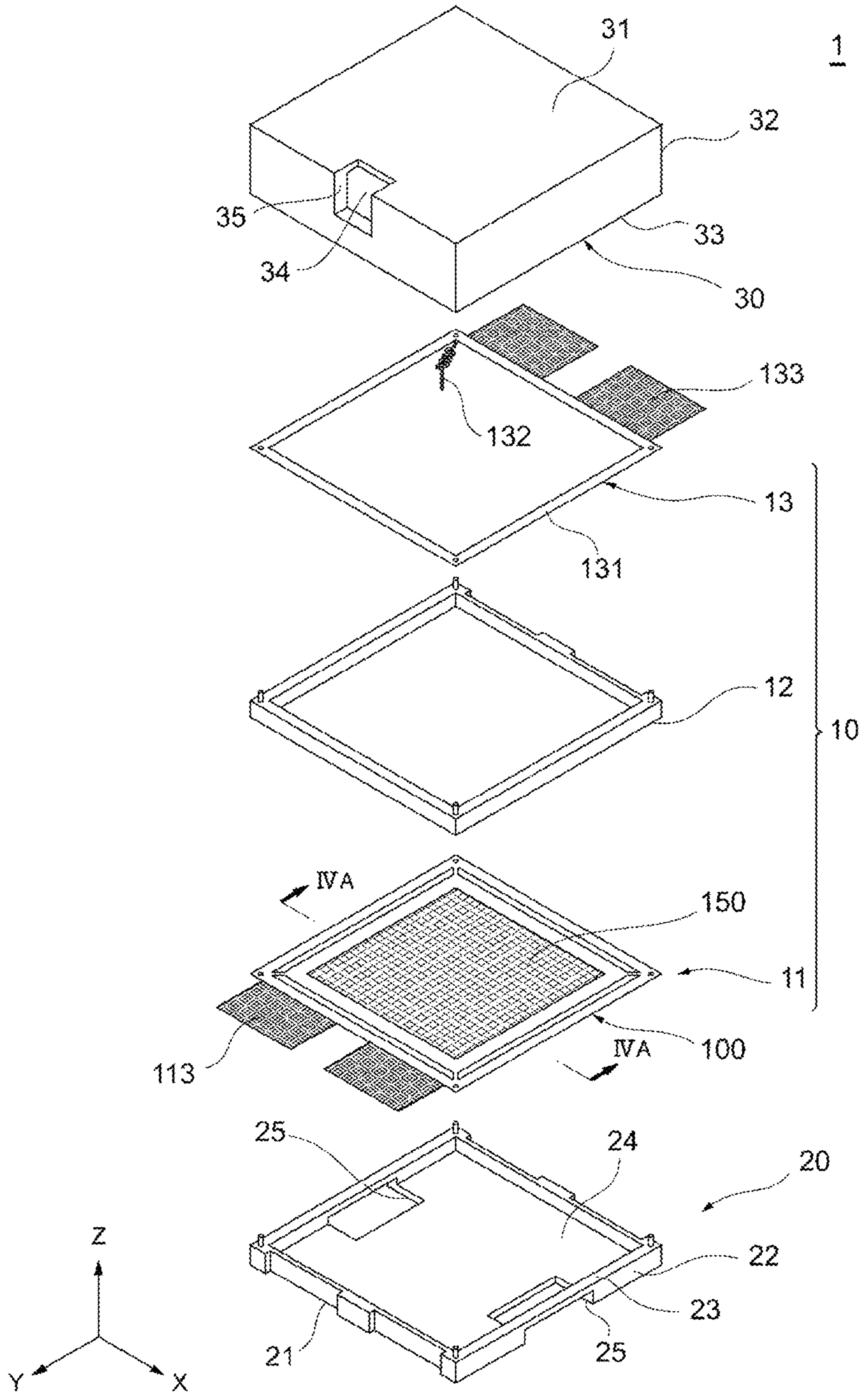
FIG. 2 is an exploded perspective view of the piezoelectric sound generating component according to the first exemplary embodiment.

A piezoelectric sound generating component 1 according to a first exemplary embodiment will be described with reference to FIGS. 1 and 2. FIG. 1 is an overall view of a piezoelectric sound generating component 1 according to a first embodiment, and FIG. 2 is an exploded perspective view of the piezoelectric sound generating component 1 according to the first embodiment. For purposes of this disclosure, FIGS. 1 and 2 selectively illustrate components required for explaining at least part of features in the configuration of the piezoelectric sound generating component 1. However, it is noted that the exemplary aspects do not prohibit the piezoelectric sound generating component 1 from including components which are not illustrated as would be appreciated to one skilled in the art.

The piezoelectric sound generating component 1 according to the first embodiment includes a piezoelectric vibration portion 10, a lower case 20 that supports the piezoelectric vibration portion 10 from the back side, and an upper case 30 that holds the piezoelectric vibration portion 10 from the front side. The piezoelectric vibration portion 10, the lower case 20, and the upper case 30 have outer edges that define square shapes of the mutually-same sizes when the piezoelectric sound generating component 1 is viewed in plan along the thickness direction of the piezoelectric sound generating component 1. Further, in the piezoelectric vibration portion 10, the lower case 20, and the upper case 30, mounting pins and mounting holes for mounting are provided on their corner portions and corresponding positions thereof.

In the following description, each component of the piezoelectric sound generating component 1 will be described based on the XYZ-axes directions where the thickness direction of the piezoelectric sound generating component 1 is defined as the "Z-axis direction", a direction of one side of the square shape of the piezoelectric sound generating component 1 is defined as the "X-axis direction", and a direction of another side (e.g., perpendicularly or orthogonally) of the square shape of the piezoelectric sound generating component 1 is defined as the "Y-axis direction". A surface of each component on the Z-axis positive direction side is defined as a "front side" and a surface of each component on the Z-axis negative direction side is defined as a "back side". Unless specifically described, "viewing in plan" means that each component is viewed in plan along the thickness direction (i.e., the Z-axis direction) of the piezoelectric sound generating component 1 (each component). Further, the shapes of the piezoelectric vibration portion 10, lower case 20, and upper case 30 obtained when the piezoelectric vibration portion 10, the lower case 20, and the upper case 30 are viewed in plan are referred to as "plan view shapes" of these components. Furthermore, a state in which the piezoelectric sound generating component 1 is structured by assembling the piezoelectric vibration portion 10, the lower case 20, and the upper case 30 is sometimes referred to as an "assembled state" for purposes of this disclosure.

The piezoelectric vibration portion 10 has a plate shape and includes a piezoelectric vibration plate 11, a spacer 12, and a terminal portion 13. These components of the piezoelectric vibration portion 10 are structured so that the piezoelectric vibration plate 11, the spacer 12, and the terminal portion 13 are stacked in this order in the Z-axis positive direction. As further shown, the outer edges of the piezoelectric vibration plate 11, spacer 12, and terminal portion 13 define square shapes in an exemplary aspect having the mutually-same sizes in plan view.

According to the exemplary aspect, the piezoelectric vibration plate 11 has a thin plate shape. The piezoelectric vibration plate 11 includes a base portion 100 (also referred to as a base) and a piezoelectric portion (or member) 150 that is provided on the center side of the surface of the base portion 100. The piezoelectric vibration plate 11 further includes two mounting terminals 113 that are provided along one side of the base portion 100 side by side. The mounting terminal 113 is an example of an input output (I/O) terminal. The mounting terminal 113 is electrically connected with a mounting substrate, which is not illustrated, and supplies an input output signal, supplied from the mounting substrate, to the piezoelectric portion 150 of the piezoelectric vibration plate 11.

Regarding the piezoelectric vibration plate 11 according to the first embodiment, when a voltage is applied to the piezoelectric portion 150 in the assembled state, the piezoelectric vibration plate 11 performs bending vibration in a manner to reciprocate between both sides in the thickness direction of the base portion 100. Details of each component of the piezoelectric vibration plate 11 will be described below. The following omits the description about the mounting terminal 113 in the piezoelectric vibration plate 11 and provides the description of the configuration by assuming that the piezoelectric vibration plate 11 includes only the base portion 100 and the piezoelectric portion 150.

Moreover, the spacer 12 is formed in a square frame shape so that a plan view shape of inner circumferential surfaces of the frame is larger than the piezoelectric portion 150 (e.g., so that the frame of the spacer 12 surrounds the outer circumference of the piezoelectric portion 150 in plan view). In an exemplary aspect, the spacer 12 is made of an insulating material such as liquid crystal polymer (LCP), for example. This spacer 12 couples the piezoelectric vibration plate 11 with the terminal portion 13 in an insulating manner and adjusts an interval between the piezoelectric vibration plate 11 and the terminal portion 13 in the Z-axis direction.

The terminal portion 13 is formed in a square frame shape so that a plan view shape of inner circumferential surfaces of the frame is larger than the piezoelectric portion 150. The terminal portion 13 is formed by applying plating or the like to iron, brass, or the like with nickel (Ni), copper (Cu), or gold (Au), for example. Further, the terminal portion 13 includes a frame 131, a terminal 132 that is provided on one corner in an inner edge of the frame 131, and two mounting terminals 133 that are provided on one side of the frame 131 side by side.

The frame 131 is formed in a square shape so that a plan view shape of inner circumferential surfaces of the frame 131 is larger than the piezoelectric portion 150. The frame 131 supports the terminal 132 and the mounting terminals 133 and electrically couples the terminal 132 and the mounting terminals 133 with each other.

The terminal 132 is an electrical contact with the piezoelectric vibration plate 11, and the terminal 132 extends toward the inside of the frame 131 and toward the piezoelectric portion 150 side, that is, extends to the X-axis positive direction and the Z-axis negative direction so as to be able to come into contact with the piezoelectric portion 150 of the piezoelectric vibration plate 11 in the assembled state. Here, the first embodiment provides the electrical contact on this single position, but a connecting position and the number of electrical contacts are not limited to this example.

The mounting terminal 133 is an example of an input output terminal. The mounting terminal 133 is electrically connected with a mounting substrate, which is not illustrated, and supplies an input output signal, supplied from the mounting substrate, to the piezoelectric portion 150 of the piezoelectric vibration plate 11 via the terminal 132.

According to the exemplary aspect, the lower case 20 is an example of a case portion and has a box shape in which an opening is formed on a side which is to be brought into contact with the piezoelectric vibration plate 11 of the piezoelectric vibration portion 10. Further, the lower case 20 is made, for example, of an insulating material such as liquid crystal polymer (LCP). The lower case 20 includes a bottom surface portion 21, a lateral wall portion 22 that is formed to protrude from the outer edge of the bottom surface portion 21, and two vent holes 25 that are formed or otherwise disposed on portions on respective opposing sides of the bottom surface portion 21.

An end surface on the opening side of the lateral wall portion 22 forms a mounting surface 23 that comes into contact with the piezoelectric vibration plate 11 during assembling. Further, inner surfaces of the bottom surface portion 21 and lateral wall portion 22 form a concave inner surface 24 of the lower case 20. The vent hole 25 is used for reducing air resistance in a space between the lower case 20 and a mounting substrate. The air resistance is produced when the piezoelectric sound generating component 1 is mounted on the mounting substrate.

The upper case 30 is an example of a case portion and has a box shape in which an opening is formed on a side which is to be brought into contact with the terminal portion 13 of the piezoelectric vibration portion 10. Further, the upper case 30 is made, for example, of an insulating material such as liquid crystal polymer (LCP). The upper case 30 includes a top surface portion 31, a lateral wall portion 32 that is formed to protrude from the outer edge of the top surface portion 31, and a sound emission hole 35 that is formed on a portion on one side of the top surface portion 31.

An end surface on the opening side of the lateral wall portion 32 forms a mounting surface 33 that comes into contact with the terminal portion 13 during assembling. Further, inner surfaces of the top surface portion 31 and lateral wall portion 32 form a concave inner surface 34 of the upper case 30. The sound emission hole 35 is used for transmitting sound generated by vibration of the piezoelectric vibration plate 11 of the piezoelectric vibration portion 10 to the outside of the lower case 20 and upper case 30.

In the piezoelectric sound generating component 1 according to the first embodiment, the piezoelectric vibration portion 10 is placed in a manner to cover the opening of the lower case 20, and the upper case 30 is placed in a manner such that the opening of the upper case 30 faces the piezoelectric vibration portion 10 and thus the upper case 30 covers the piezoelectric vibration portion 10. Thus, the piezoelectric vibration portion 10 is sandwiched and fixed between the lower case 20 and the upper case 30. In the assembled state, an acoustic space D (see FIG. 4A) is formed between the inner surface 24 of the lower case 20 and the piezoelectric vibration plate 11 of the piezoelectric vibration portion 10, and an acoustic space U (see FIG. 4A) is formed between the inner surface 34 of the upper case 30 and the piezoelectric vibration plate 11 of the piezoelectric vibration portion 10. Accordingly, in the piezoelectric sound generating component 1, when an AC voltage is applied to the piezoelectric portion 150 of the piezoelectric vibration portion 10 via the mounting terminals 133 and mounting terminals 113 that are input output terminals, the base portion 100 (e.g., a central portion 110 described later) of the piezoelectric vibration portion 10 performs bending vibration in the acoustic space D and the acoustic space U in a manner to reciprocate between the both sides in the thickness direction of the base portion 100, generating sound. The generated sound is transmitted to the outside of the lower case 20 and upper case 30 through the sound emission hole 35 and the vent holes 25.

<Piezoelectric Vibration Plate 11>

Figure 3:
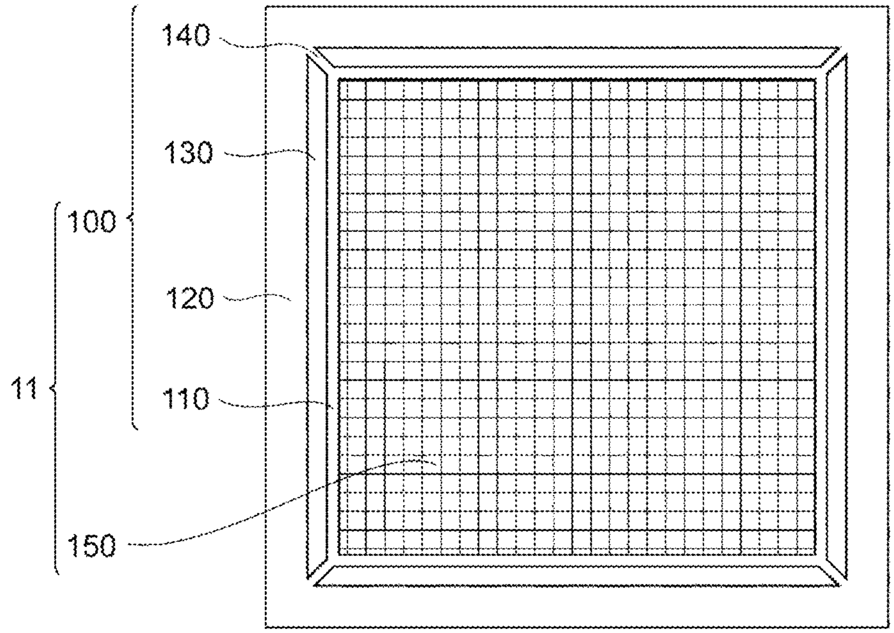
FIG. 3 is a drawing for explaining a configuration of a piezoelectric vibration plate according to the first exemplary embodiment.

The configuration of the piezoelectric vibration plate 11 according to the first embodiment will now be described in more detail with reference to FIG. 3. FIG. 3 is a drawing for explaining the configuration of the piezoelectric vibration plate 11 according to the first embodiment.

Here, forming a slit on the base portion 100 can be considered so as to improve a displacement property of the base portion 100 of the piezoelectric vibration plate 11 described above. On the other hand, due to the provision of the slit, air existing on the both sides in the thickness direction of the base portion 100 circulates by convection through the slit when the base portion 100 vibrates. This air convection inhibits the piezoelectric vibration plate 11 from sounding. Slit sealing can be considered with respect to the air convection problem caused by the slit. However, this may produce problems in that a sealing material inhibits the base portion 100 from vibrating and the configuration of the base portion 100 becomes complicated, for example, making it impossible to obtain favorable acoustic conversion efficiency.

In contrast to this, the piezoelectric sound generating component 1 or piezoelectric vibration plate 11 according to the first embodiment obtains favorable acoustic conversion efficiency by using the base portion 100 having the simple configuration described below.

The piezoelectric vibration plate 11 according to the first embodiment includes the base portion 100 and the piezoelectric portion 150 that is electrically and mechanically bonded to the base portion 100 on the center side of the upper surface of the base portion 100.

According to an exemplary aspect, the base portion 100 is a thin plate member having the thickness of 0.05 mm and has a square shape, each side of which has the length of 18 mm in plan view, for example. The base portion 100 is made of a material having high conductivity and spring elasticity, for example, metal such as 42 alloy having an elastic modulus of 1 GPa or greater.

Further, the base portion 100 includes the central portion 110, a circumferential portion 120, a penetration portion 130, and a coupling portion 140. The circumferential portion 120 is on the periphery of the central portion 110. The penetration portion 130 is positioned between the central portion 110 and the circumferential portion 120. The coupling portion 140 couples the central portion 110 with the circumferential portion 120. In the exemplary aspect, the central portion 110, the circumferential portion 120, and the coupling portion 140 are integrally formed. That is, the central portion 110 is partially separated from the circumferential portion 120 by the penetration portion 130 formed around the central portion 110.

By bonding the piezoelectric portion 150 face to face, the central portion 110 forms a portion that performs bending vibration in a manner to reciprocate between both sides in the thickness direction of the base portion 100. Further, the central portion 110 is formed to have a square plan view shape that is larger than the plan view shape of the piezoelectric portion 150 and smaller than the plan view shape of the inner surface 24 of the lower case 20 and the plan view shape of the inner surface 34 of the upper case 30. Thus, the central portion 110 can secure an area for supporting the piezoelectric portion 150 and its own vibrating area and can vibrate without hitting the lower case 20 and the upper case 30.

The circumferential portion 120 is a portion that comes into contact with and is sandwiched by the lower case 20 and the upper case 30 when the lower case 20 and the upper case 30 are mounted on the piezoelectric vibration portion 10 by a method of adhesion, fitting, or caulking, for example. Accordingly, the circumferential portion 120 is a portion that hardly vibrates in contrast to the central portion 110. Further, the circumferential portion 120 is a frame-like member and plan view shapes of its outer edge and inner edge are square in the exemplary aspect.

The penetration portion 130 has a slit-like plan view shape. In the example illustrated in FIG. 3, the penetration portion 130 having the slit shape has a plan view shape of an isosceles trapezoid when one side thereof in the longitudinal direction is defined as a bottom side. In the first embodiment, four penetration portions 130 (e.g., four slits) are formed between the central portion 110 and the circumferential portion 120. These penetration portions 130 having the isosceles trapezoid shape are formed at equal intervals in a manner such that the bottom sides of the penetration portions 130 are respectively parallel to four sides of the central portion 110, the upper bases face the central portion 110 side, and the lower bases face the circumferential portion 120 side.

In the example illustrated in FIG. 3, the penetration portion 130 having the isosceles trapezoid shape has 450 of internal angles, for example, on the both ends of the lower base. Accordingly, a portion between both legs of penetration portions 130 which are adjacent to each other, that is, the coupling portion 140 described later can couple a corner portion of the central portion 110 with an internal angle of the circumferential portion 120. Also, the height of the isosceles trapezoid, namely, the slit width (i.e., a width in a short direction) of the penetration portion 130 is greater than 0 mm and smaller than or equal to 0.1 mm, for example. The employment of the penetration portion 130 having such a small slit width can suppress convection of air existing in both sides in the thickness direction of the central portion 110 when the central portion 110 vibrates.

The coupling portion 140 electrically connects the central portion 110 with the circumferential portion 120 and supports the central portion 110 that is separated from the circumferential portion 120 by the penetration portion 130. In the first embodiment, the coupling portion 140 is a portion that is positioned between the central portion 110 and the circumferential portion 120 and is not penetrated by the penetration portion 130. In other words, the coupling portion 140 is a coupling portion positioned between two penetration portions 130 which are adjacent to each other. Therefore, four coupling portions 140 are formed in the first embodiment. These coupling portions 140 are formed so that the coupling portions 140 respectively couple four corner portions of the central portion 110 with four internal angles of the circumferential portion 120 between the central portion 110 and the circumferential portion 120 in a manner to correspond to an arrangement and shapes of the four penetration portions 130. As the plan view shape of the central portion 110 is square, these coupling portions 140 are arranged on the farthest positions from the center of the central portion 110. That is, the coupling portions 140 are arranged on positions that are least affected by the vibration of the central portion 110.

The piezoelectric portion 150 is a thin plate member having the thickness of approximately 0.1 mm, for example, and has a square shape, each side of which has the length of 13 mm in plan view. Moreover, the piezoelectric portion 150 is preferably made of piezoelectric ceramics such as PZT. Further, a NiCu electrode, which is not illustrated, is formed on each of the front surface and the back surface of the piezoelectric portion 150. The electrode on the back surface is bonded to the central portion 110 face to face, generating electrical conduction.

<Bending Vibration of Piezoelectric Vibration Plate 11>

Figure 4A:
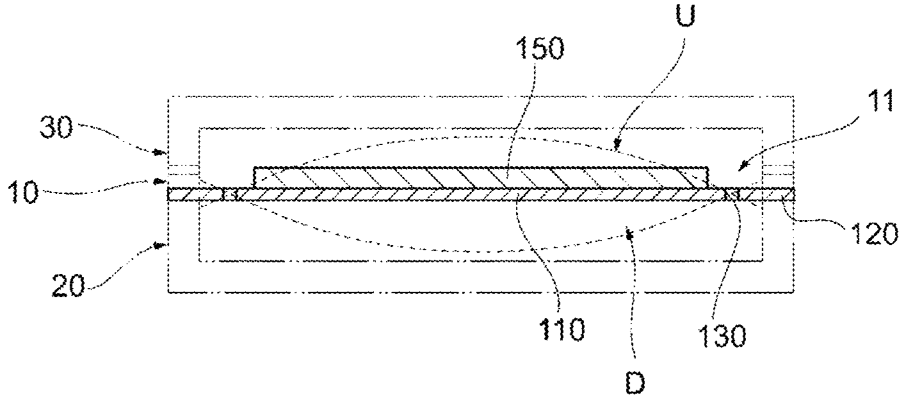
FIG. 4A is an IVA-IVA line sectional view of the piezoelectric vibration plate in FIG. 2.
Figure 4B:
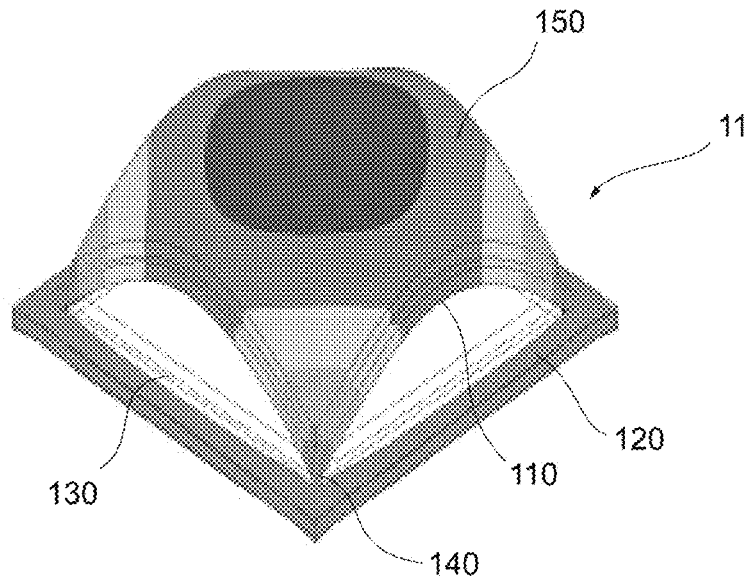
FIG. 4B is a schematic view of displacement distribution in the maximum displacement of the piezoelectric vibration plate according to the first exemplary embodiment.
Figure 5:
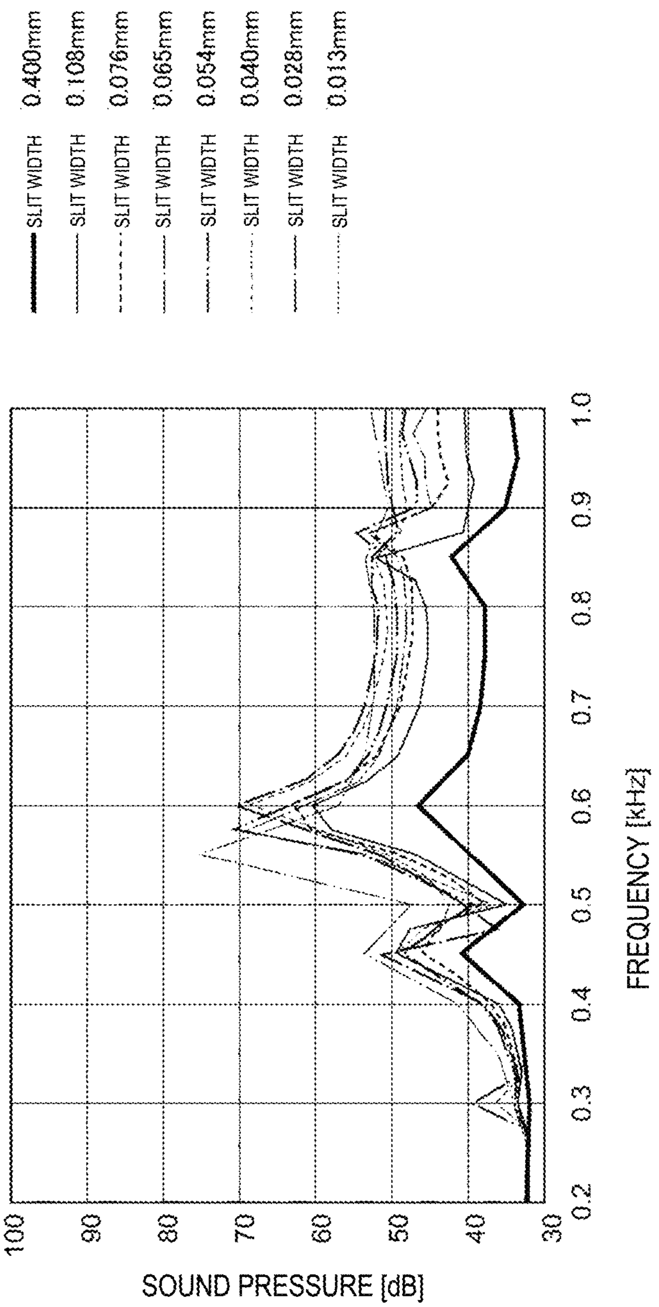
FIG. 5 is a drawing for explaining sound pressure frequency characteristics of the piezoelectric vibration plate according to the first exemplary embodiment.

The bending vibration of the piezoelectric vibration plate 11 according to the first embodiment will now be described with reference to FIGS. 2 to 5. In the following, after providing the description on the entire aspect of the bending vibration of the piezoelectric vibration plate 11 and the description on a relation between the bending vibration and the structure of the coupling portion 140, the description on a relation between the bending vibration and the structure of the penetration portion 130 will be provided. FIGS. 4A and 4B are drawings for explaining displacement of the piezoelectric vibration plate 11 according to the first embodiment. Specifically, FIG. 4A is an IVA-IVA line sectional view of the piezoelectric vibration plate 11 portion in FIG. 2, and FIG. 4B is a schematic view of displacement distribution in a state of the maximum displacement of the piezoelectric vibration plate 11. In FIG. 4B, portions illustrated with the same density represent the same magnitude of vibration. FIG. 5 is a drawing for explaining sound pressure frequency characteristics of the piezoelectric vibration plate 11 according to the first embodiment. In FIG. 5, the vertical axis represents sound pressure (dB) and the horizontal axis represents a frequency (kHz).

<Relation Between Bending Vibration and Structure of Coupling Portion 140>

First, description is given for the entire aspect of the bending vibration of the piezoelectric vibration plate 11 and the relation between the bending vibration and the structure of the coupling portion 140. As illustrated with a dashed line in FIG. 4A, the central portion 110 performs bending vibration in a manner to reciprocate between both sides in the thickness direction of the base portion 100 when a voltage is applied to the piezoelectric portion 150. That is, the central portion 110 repeats displacement toward the lower case 20 and displacement toward the upper case 30.

In the following, the displacement toward the lower case 20 generated in the central portion 110 of the piezoelectric vibration plate 11 is referred to as "first displacement" and the displacement toward the upper case 30 generated in the central portion 110 of the piezoelectric vibration plate 11 is referred to as "second displacement", for the convenience of the explanation.

In general, vibration concentrically diffuses from the vibration center toward the periphery, and the vibration becomes weaker as the distance increases from the vibration center. In the piezoelectric vibration plate 11 according to the first embodiment, as the piezoelectric portion 150 is bonded to the center portion of the central portion 110, the center of the plan view shape of the central portion 110 is the vibration center of the central portion 110. As illustrated in FIG. 4B, when vibration of the central portion 110 is strongest, the center portion of the central portion 110 rises higher than other portions (the case of the second displacement) or subsides lower than other portions (the case of the first displacement), that is, the displacement of the center portion is the largest. On the other hand, the vibration of the central portion 110 becomes weaker as the vibration diffuses from the center of the central portion 110 toward the circumferential side, and displacement of corresponding portions gradually decreases.

The plan view shape of the central portion 110 according to the first embodiment is square and therefore, four corner portions of the central portion 110 are arranged on the farthest positions from the center (i.e., the vibration center) of the central portion 110. As illustrated in FIG. 4B, the corner portions of the central portion 110 hardly vibrate similarly to the circumferential portion 120. The coupling portions 140 formed on further positions from the vibration center than the corner portions of the central portion 110 are less affected by the vibration than the corner portions of the central portion 110. Therefore, the coupling portions 140 hardly vibrate as is the case with the corner portions of the central portion 110 and the circumferential portion 120.

The coupling portions 140 are thus arranged on the farthest positions from the center of the central portion 110 and therefore, the coupling portions 140 are hardly affected by vibration even when the central portion 110 vibrates in a manner such that the center portion thereof is largely displaced. This configuration suppresses an occurrence of a problem, for example, of a fatigue failure such as fracture caused by deformation, being able to improve durability of the piezoelectric vibration plate 11. Further, as the coupling portions 140 hardly vibrate, strength of the coupling portions 140 is sufficiently secured even when the coupling portions 140 having the small width, for example, are employed. The coupling portions 140 having the smaller width enable securement of the sufficient length of the penetration portions 130 in the longitudinal direction, being able to further reduce inhibition with respect to the vibration of the central portion 110. Thus, the displacement property (e.g., vibration property) of the central portion 110 is improved and the piezoelectric vibration plate 11 can obtain further favorable acoustic conversion efficiency.

That is, by arranging the coupling portions 140 on the farthest positions from the center of the central portion 110, the durability of the piezoelectric vibration plate 11 is improved and favorable acoustic conversion efficiency is obtained.

<Relation Between Bending Vibration and Structure of Penetration Portion 130>

Subsequently, the relation between the bending vibration of the piezoelectric vibration plate 11 and the structure of the penetration portion 130 is described. In the piezoelectric vibration portion 10 (i.e., the piezoelectric vibration plate 11), air exists in the penetration portions 130 that are positioned between the central portion 110 and the circumferential portion 120. In the state of normal temperature and normal pressure (i.e., a normal state), air is a substance having low viscosity and the viscosity $\mu$ is approximately 0.018 mPa·s. When the central portion 110 does not perform bending vibration, air existing in the penetration portions 130 is in the normal state and has low viscosity. Such air having low viscosity easily flows out from the penetration portions 130 and goes toward the acoustic space D or the acoustic space U depending on the change in states (for example, pressure and the like) of the acoustic space D and the acoustic space U.

On the other hand, when the central portion 110 that is on one sides of the penetration portions 130 performs bending vibration with respect to the circumferential portion 120 that is on the other sides of the penetration portions 130 and is fixed by the lower case 20 and the upper case 30, shearing stress (e.g., frictional stress) $\tau$ is generated in the air existing in the penetration portions 130. In this case, actual viscosity $\mu$ of the air hardly changes, but the high frictional stress $\tau$ makes the air hard to flow with respect to slit wall surfaces of the penetration portions 130. As a result, the air existing in the penetration portions 130 can be considered to have characteristics similar to those of a substance having high viscosity. That is, the air existing in the penetration portions 130 have characteristics similar to high viscosity in this case.

In the following, such characteristics of air existing in the penetration portion 130 will be described in detail by using Formula (1) below. In the present embodiment, "$\tau$" in Formula (1) below denotes frictional stress (e.g., shearing stress), specifically, frictional stress of air existing in the penetration portion 130 with respect to the slit wall surfaces of the penetration portion 130. "F" denotes a force, specifically, a force generated between the air existing in the penetration portion 130 and the slit wall surfaces of the penetration portion 130. "S" denotes a cross-sectional area of the penetration portion 130. "$\mu$" denotes a proportional coefficient, representing viscosity of the air existing in the penetration portion 130. The value of $\mu$ of air hardly changes within the normal state. "U" denotes a relative speed, specifically a relative speed obtained when the central portion 110 performs bending vibration with respect to the circumferential portion 120 that is fixed by the lower case 20 and the upper case 30. "h" denotes a slit width of the penetration portion 130.

$$\tau = F/S = \mu * U/h \tag{1}$$

According to Formula (1), in the state in which the proportional coefficient $\mu$ is fixed, the frictional stress $\tau$ is increased when a U/h ratio between the relative speed U of the central portion 110 with respect to the circumferential portion 120 and the slit width h of the penetration portion 130 is increased. In the present embodiment, the relative speed U of the central portion 110 with respect to the circumferential portion 120 is a high speed that is in a range from approximately 2 kHz to 10 kHz. h denoting the slit width of the penetration portion 130 is a small dimension that is greater than 0 mm and smaller than or equal to 0.1 mm. Therefore, the U/h ratio according to the present embodiment has a remarkably high value. Accordingly, when the central portion 110 performing such bending vibration and the penetration portion 130 having the small slit width are employed, large frictional stress τ can be obtained.

Thus, when the central portion 110 performs bending vibration at high speed with respect to the circumferential portion 120 which is fixed, high frictional stress τ is generated in the air existing in the penetration portion 130 having the small slit width. The high frictional stress τ makes the air hard to flow with respect to the slit wall surfaces of the penetration portion 130. In other words, the air existing in the penetration portion 130 can be considered as a substance having high viscosity (characteristics similar to high viscosity), thereby being hard to flow out from the penetration portion 130. As a result, the air existing in the penetration portion 130 can exhibit an effect for disturbing convection of air existing in the acoustic space U and the acoustic space D that are on respective both sides of the penetration portion 130. That is, the air existing in the acoustic space D hardly flows into the acoustic space U through the penetration portion 130, and the air existing in the acoustic space U also hardly flows into the acoustic space D through the penetration portion 130.

Describing the slit width of the penetration portion 130 in more detail, a peak of sound pressure is seen when the slit width of the penetration portion 130 is set to 0.108 mm or smaller compared to when the slit width is set to 0.400 mm, in a low frequency band from 0.55 kHz to 0.6 kHz, as illustrated in FIG. 5. Specifically, when the slit width of the penetration portion 130 is set to 0.108 mm, high sound pressure of 60.1 dB can be obtained. Further, when the slit width of the penetration portion 130 is set to 0.040 mm or smaller, high sound pressure of approximately 70 dB can be obtained. Furthermore, when the slit width of the penetration portion 130 is set to 0.013 mm, high sound pressure of approximately 75 dB can be obtained. That is, if the slit width of the penetration portion 130 is set to 0.1 mm or smaller, high sound pressure that is higher than 60 dB can be obtained in the low frequency band from 0.55 kHz to 0.6 kHz and accordingly, favorable acoustic conversion efficiency can be obtained.

On the other hand, when the slit width of the penetration portion 130 is set to 0.400 mm, a peak of sound pressure is not clearly seen in the low frequency band from 0.55 kHz to 0.6 kHz. The highest sound pressure in this case is approximately 47 dB, which is approximately 78% of the one obtained when the slit width of the penetration portion 130 is 0.108 mm. That is, high sound pressure cannot be obtained when the slit width of the penetration portion 130 is set to 0.400 mm.

Thus, setting the slit width of the penetration portion 130 to 0.1 mm or smaller makes it possible to suppress convection of air in the acoustic space D and air in the acoustic space U through the penetration portions 130 in vibration of the base portion 100, without sealing the penetration portions 130. Accordingly, a range of a separating portion between the central portion 110 and the circumferential portion 120 can be expanded and the inhibition with respect to the vibration of the central portion 110 caused by coupling between the central portion 110 and the circumferential portion 120 can be reduced. Thus, the displacement property (e.g., vibration property) of the central portion 110 is improved and the piezoelectric vibration plate 11 can obtain further favorable acoustic conversion efficiency. Further, this case simplifies the structure of the base portion 100 of the piezoelectric vibration plate 11 and can realize manufacturing cost reduction and productivity enhancement.

Namely, even when the piezoelectric vibration plate 11 having the simple structure is employed, favorable acoustic conversion efficiency can be obtained by setting the slit width of the penetration portion 130 to 0.1 mm or smaller.

As mentioned above, even with the simple structure, the piezoelectric vibration plate 11 having high durability and exhibiting favorable acoustic conversion efficiency can be obtained by employing the coupling portion 140 and the penetration portion 130 according to the first embodiment.

Second Exemplary Embodiment

Figure 6:
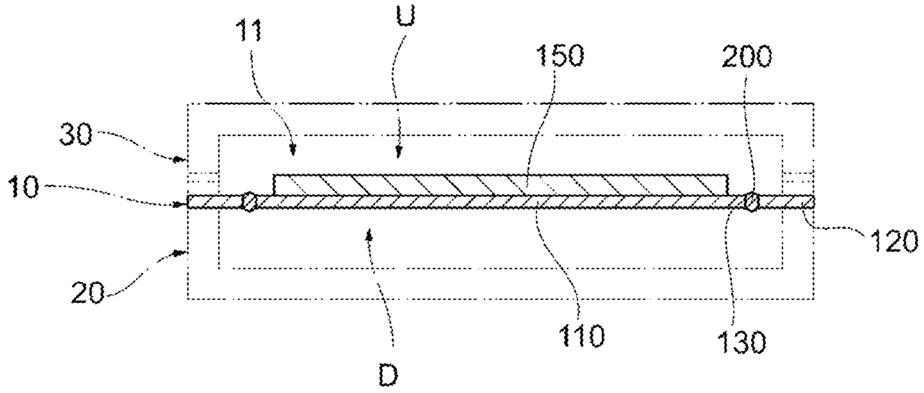
FIG. 6 is a drawing for explaining a structure of a sealing material in a piezoelectric vibration plate according to a second exemplary embodiment.
Figure 7:
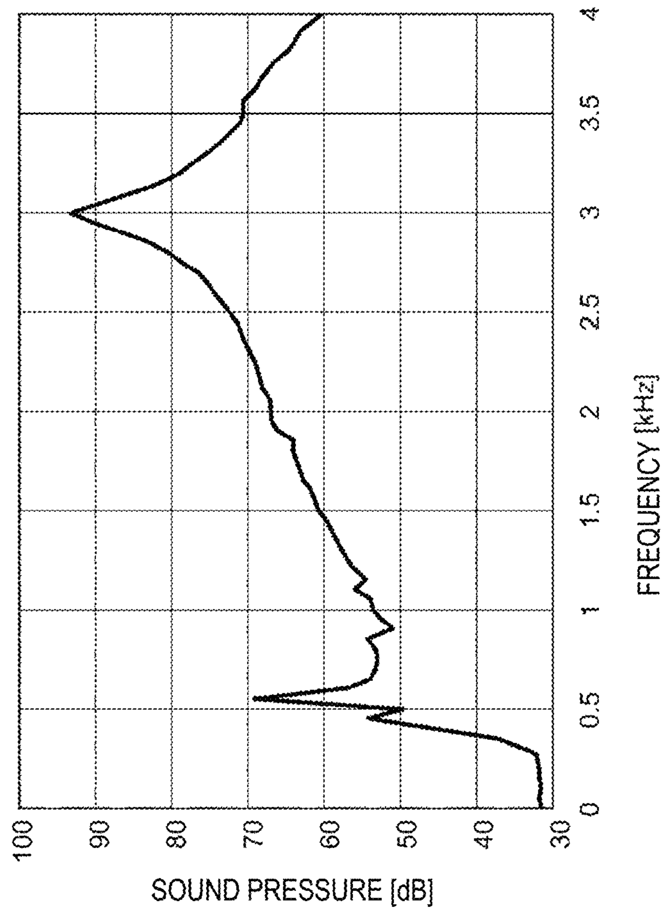
FIG. 7 is a drawing for explaining sound pressure frequency characteristics of the piezoelectric vibration plate according to the second exemplary embodiment.

The structure of the piezoelectric vibration plate 11 according to a second embodiment will now be described in detail with reference to FIGS. 6 and 7. FIG. 6 is a drawing for explaining a structure of a sealing material 200 for sealing the penetration portion 130 of the piezoelectric vibration plate 11 according to the second embodiment, and FIG. 7 is a drawing for explaining sound pressure frequency characteristics of the piezoelectric vibration plate 11 according to the second embodiment. In FIG. 7, the vertical axis represents sound pressure (dB) and the horizontal axis represents a frequency (kHz).

The second embodiment focuses on restricting air convection by providing a restriction portion to the penetration portion 130 and employs the sealing material 200 sealing the penetration portion 130, which is different from the first embodiment. The second embodiment will omit the description of matters common to those of the first embodiment and describe only different points, namely, the structure and advantageous effects of the sealing material 200. In particular, the same advantageous effects obtained from the same structure will not be mentioned.

The penetration portion 130 according to the second embodiment has the sealing material 200. Further, in the second embodiment, the penetration portion 130 and the coupling portion 140 may have different structures from those of the penetration portion 130 and the coupling portion 140 of the first embodiment. Specifically, the width of the penetration portion 130 according to the second embodiment does not have to be set to 0.1 mm or smaller as in the first embodiment and an arbitrary width can be selected depending on an actual requirement. The width of the penetration portion 130 is 0.4 mm in this configuration, for example. The coupling portions 140 according to the second embodiment do not have to be arranged on the farthest positions from the center of the central portion 110 as in the first embodiment, and arbitrary arrangement positions can be selected depending on actual requirement.

The sealing material 200 is an example of a restriction portion and is made, for example, of an elastic material which is elastically deformable such as resin. The sealing material 200 is embedded in the penetration portion 130 so as to entirely seal the penetration portion 130, in the second embodiment.

The penetration portion 130 of the base portion 100 is thus sealed with the sealing material 200 and therefore, the acoustic space D and the acoustic space U are completely independent spaces from each other. In other words, sealing with the sealing material 200 closes the penetration portion 130 that is a coupling path for air in the acoustic space D and air in the acoustic space U. Accordingly, even when the base portion 100 vibrates, the air in the acoustic space D and the air in the acoustic space U do not circulate by convection.

Further, the sealing material 200 is an elastically deformable material and elastically deforms along with displacement generated by vibration of the central portion 110. Therefore, even when the central portion 110 and the circumferential portion 120 are coupled with each other with the sealing material 200 interposed therebetween, the vibration of the central portion 110 is hardly inhibited by the sealing material 200. The central portion 110 can be accordingly largely displaced, being able to realize favorable acoustic conversion efficiency. Further, the coupling portion 140 is reinforced by the sealing material 200 existing in the periphery thereof, and the durability and stability of the piezoelectric vibration plate 11 are accordingly improved.

As illustrated in FIG. 7, a peak of sound pressure is seen in the low frequency band from 0.55 kHz to 0.6 kHz when the sealing material 200 is employed. In this case, high sound pressure of approximately 69 dB can be obtained and accordingly, favorable acoustic conversion efficiency can be obtained.

As mentioned above, the employment of the sealing material 200 according to the second embodiment can enhance the durability and stability of the piezoelectric vibration plate 11 and obtain favorable acoustic conversion efficiency.

Third Exemplary Embodiment

Figure 8A:
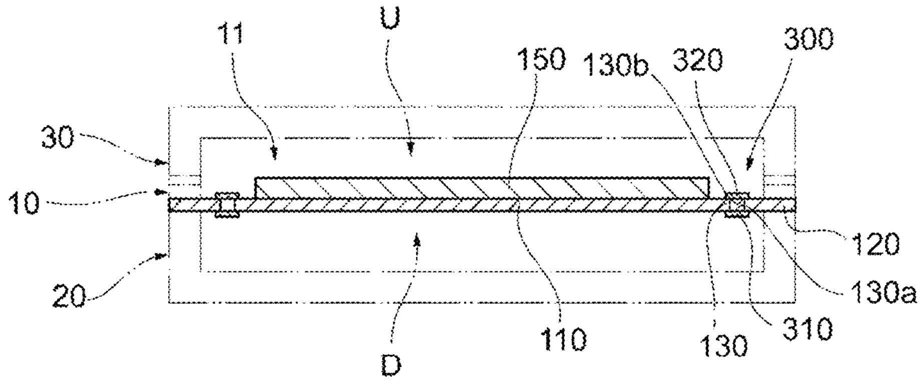
FIG. 8A is a drawing for explaining a state of a switching valve obtained when a central portion of a piezoelectric vibration plate according to a third embodiment is not displaced.
Figure 8B:
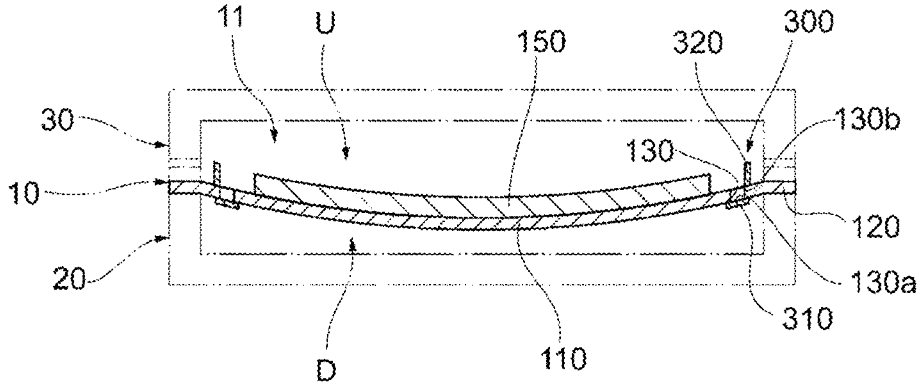
FIG. 8B is a drawing for explaining a state of the switching valve obtained when the central portion of the piezoelectric vibration plate according to the third embodiment performs first displacement.
Figure 8C:
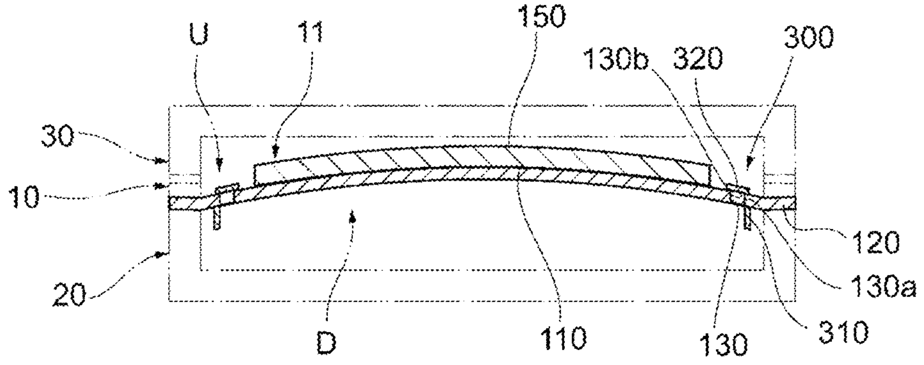
FIG. 8C is a drawing for explaining a state of the switching valve obtained when the central portion of the piezoelectric vibration plate according to the third embodiment performs second displacement.
Figure 9:
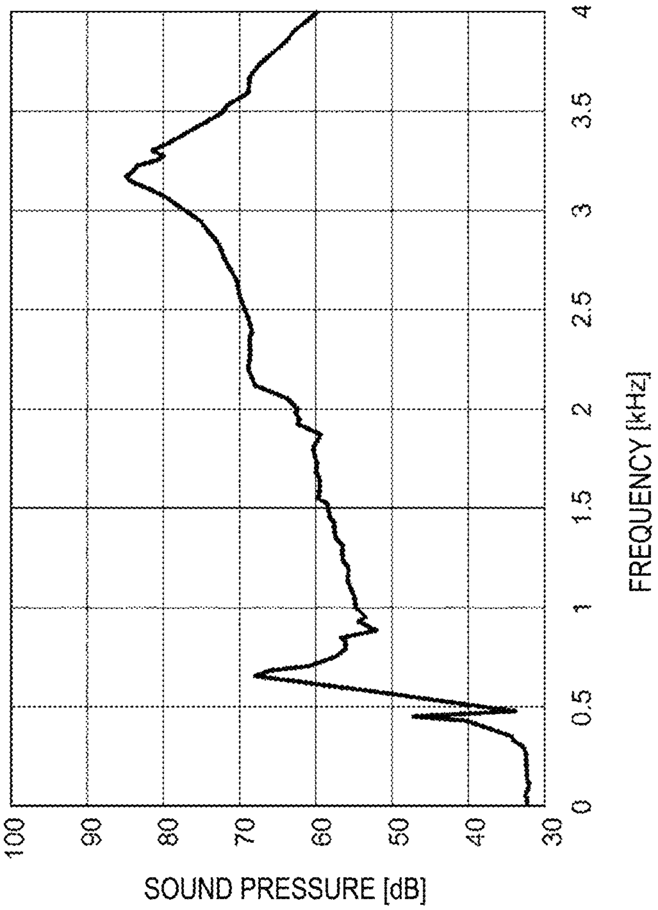
FIG. 9 is a drawing for explaining sound pressure frequency characteristics of the piezoelectric vibration plate according to the third exemplary embodiment.

The structure of the piezoelectric vibration plate 11 according to a third embodiment will now be described in detail with reference to FIGS. 8A-8C and 9. FIGS. 8A to 8C are drawings for explaining a structure of a switching valve 300 that is provided to the penetration portion 130 of the piezoelectric vibration plate 11 according to the third embodiment. Specifically, FIG. 8A is a drawing illustrating a state of the switching valve 300 obtained when the central portion 110 is not displaced, FIG. 8B is a drawing illustrating a state of the switching valve 300 obtained when the central portion 110 performs first displacement, and FIG. 8C is a drawing illustrating a state of the switching valve 300 obtained when the central portion 110 performs second displacement. FIG. 9 is a drawing for explaining sound pressure frequency characteristics of the piezoelectric vibration plate 11 according to the third embodiment. In FIG. 9, the vertical axis represents sound pressure (dB) and the horizontal axis represents a frequency (kHz). The following description is mainly about the state in which the central portion 110 performs the first displacement. The state in which the central portion 110 performs the second displacement is simply the reverse of the state of the first displacement and the principle is the same. Therefore, the description on the state of the second displacement is simplified here.

The third embodiment focuses on restricting air convection by providing a restriction portion to the penetration portion 130 as is the case with the second embodiment. The third embodiment is different from the second embodiment in that the third embodiment employs the switching valve 300 instead of the sealing material 200 employed in the second embodiment. The third embodiment will omit the description of matters common to those of the first embodiment and the second embodiment and describe only different points, namely, the structure and advantageous effects of the switching valve 300. In particular, the same advantageous effects obtained from the same structure will not be mentioned.

In the third embodiment, the penetration portion 130 and the coupling portion 140 may have different structures from those of the penetration portion 130 and the coupling portion 140 of the first embodiment. Specifically, the width of the penetration portion 130 according to the third embodiment does not have to be set to 0.1 mm or smaller as in the first embodiment and an arbitrary width can be selected depending on an actual requirement. The width of the penetration portion 130 is 0.4 mm in this example. It is also noted that the coupling portions 140 according to the third embodiment do not have to be arranged on the farthest positions from the center of the central portion 110 as in the first embodiment, and arbitrary arrangement positions can be selected depending on actual requirement. In the exemplary aspect, the penetration portion 130 according to the third embodiment is formed to have the same width as the penetration portion 130 according to the second embodiment, but the penetration portion 130 according to the third embodiment may have a different width from the penetration portion 130 according to the second embodiment.

The switching valve 300 is an example of a restriction portion and is made, for example, of an elastic material such as a resin film. Further, the switching valve 300 includes a first valve 310 and a second valve 320. As illustrated in FIG. 8A, the first valve 310 is provided to cover a first opening **130*a* of the penetration portion 130 on the acoustic space D side and the second valve 320 is provided to cover a second opening 130*b* of the penetration portion 130 on the acoustic space U side in a state in which the piezoelectric vibration plate 11 does not vibrate, that is, the state in which the central portion 110 is not displaced. The first valve 310 and the second valve 320 can open and close the first opening 130*a* and second opening 130*b* of the penetration portion 130 respectively in response to the bending vibration of the piezoelectric vibration plate 11**.

When the central portion 110 performs the first displacement, pressure Pd of air existing in the acoustic space D is raised and pressure Pu of air existing in the acoustic space U is reduced, as illustrated in FIG. 8B. The first valve 310 is pressed onto the back surface of the base portion 100 by the raised pressure Pd in a manner to cover the first opening **130*a* of the penetration portion 130 on the acoustic space D side. On the other hand, the second valve 320 opens the second opening 130*b* of the penetration portion 130 on the acoustic space U side in accordance with pressing force reduction caused by the reduced pressure Pu and drawing caused by the first displacement of the central portion 110**.

Thus, in the first displacement state of the central portion 110, the first valve 310 closes the first opening **130*a* of the penetration portion 130 on the acoustic space D side and the second valve 320 opens the second opening 130*b* of the penetration portion 130 on the acoustic space U side. The first opening 130*a* of the penetration portion 130 of the base portion 100 is thus closed with the first valve 310, making the acoustic space D and the acoustic space U be completely independent spaces from each other. In other words, the first valve 310 closes the penetration portion 130 that is a coupling path for the air in the acoustic space D and the air in the acoustic space U. Accordingly, even when the base portion 100** vibrates, the air in the acoustic space D and the air in the acoustic space U do not circulate by convection.

When the central portion 110 performs the second displacement, the second valve 320 closes the second opening **130*b* of the penetration portion 130 on the acoustic space U side and the first valve 310 opens the first opening 130***a* of the penetration portion 130 on the acoustic space D side, as illustrated in FIG. 8C. The second opening 130*b* of the penetration portion 130 of the base portion 100 is thus closed with the second valve 320, producing no convection of the air in the acoustic space U and the air in the acoustic space D even when the base portion 100 vibrates.

As illustrated in FIG. 9, a peak of sound pressure is seen in the low frequency band from 0.55 kHz to 0.6 kHz when the switching valve 300 is employed. In this case, high sound pressure of approximately 68 dB can be obtained and accordingly, favorable acoustic conversion efficiency can be obtained.

The employment of the switching valve 300 that can open and close the penetration portion 130 securely suppresses the convection of the air in the acoustic space D and the air in the acoustic space U and maintains of the separate state between the central portion 110 and the circumferential portion 120 further reduce the inhibition with respect to the vibration of the central portion 110 caused by coupling between the central portion 110 and the circumferential portion 120. Thus, the displacement property (e.g., vibration property) of the central portion 110 is improved and the piezoelectric vibration plate 11 can obtain further favorable acoustic conversion efficiency. Further, the switching valve 300 is made from a film in this structure, and, thus, the structure of the base portion 100 of the piezoelectric vibration plate 11 is simple, being able to realize manufacturing cost reduction and productivity enhancement.

Thus, even with the simple structure, the piezoelectric vibration plate 11 exhibiting favorable acoustic conversion efficiency can be obtained by employing the switching valve 300 according to the third embodiment.

The exemplary embodiments of the present invention have been described thus far.

The piezoelectric vibration plate 11 according to one embodiment of the present invention includes: the base portion or base 100 that includes the central portion 110 and the circumferential portion 120 and has conductivity, with the circumferential portion 120 being positioned on a periphery of the central portion 110. Moreover, the piezoelectric portion 150 is provided on the central portion 110. The central portion 110 performs bending vibration in a manner to reciprocate between both sides in a thickness direction of the base portion 100 when a voltage is applied to the piezoelectric portion 150. The base portion 100 includes at least one penetration portion 130 which is positioned between the central portion 110 and the circumferential portion 120, and at least one coupling portion 140 which couples the central portion 110 and the circumferential portion 120 with each other. The at least one coupling portion 140 is arranged on a farthest position from a center, at which maximum displacement is generated in the bending vibration, of the central portion 110 of the base portion 100.

According to the above-described configuration, improvement in the durability of the piezoelectric vibration plate is realized and favorable acoustic conversion efficiency are obtained.

In the above-described configuration, the at least one penetration portion 130 has a slit shape.

According to the above-described configuration, improvement in the displacement property of the piezoelectric vibration plate can be realized and accordingly, favorable acoustic conversion efficiency can be obtained.

In the above-described configuration, a slit width of the penetration portion 130 having the slit shape is greater than 0 mm and smaller than or equal to 0.1 mm.

According to the above-described configuration, improvement in the durability of the piezoelectric vibration plate is realized and favorable acoustic conversion efficiency is obtained by employing the simple structure.

In the piezoelectric vibration plate 11 according to another embodiment of the present invention, the penetration portion 130 includes a restriction portion that restricts inflow of air existing in a first side in the thickness direction of the base portion 100 to a second side in the thickness direction through the penetration portion 130 and restricts inflow of air existing in the second side in the thickness direction to the first side through the penetration portion 130.

According to the above-described configuration, favorable acoustic conversion efficiency is obtained by reducing an influence of air convection.

In the above-described configuration, the restriction portion is the sealing material 200 that seals at least a portion of the at least one penetration portion 130 and elastically deforms.

According to the above-described configuration, the influence of air convection is securely reduced by employing the simple structure.

In the above-described configuration, the sealing material 200 is made of resin.

According to the above-described configuration, inhibition with respect to displacement of the piezoelectric vibration plate is reduced.

In the piezoelectric vibration plate 11 according to another embodiment of the present invention, the restriction portion is the switching valve 300 that renders the at least one penetration portion 130 openable and closeable.

According to the above-described configuration, the displacement property is improved and the influence of air convection is securely reduced.

In the above-described configuration, the switching valve 300 opens and closes the at least one penetration portion 130 in response to the bending vibration of the piezoelectric vibration plate 11.

According to the above-described configuration, the influence of air convection is securely reduced.

In the above-described configuration, the at least one penetration portion 130 includes one opening that is positioned on one side in the thickness direction of the base portion 100 and the other opening that is positioned on the other side in the thickness direction of the base portion 100. The switching valve 300 includes the first valve 310 provided on the one opening and the second valve 320 provided on the other opening. When the piezoelectric vibration plate 11 performs the second displacement from the one side toward the other side, the second valve 320 closes the other opening of the penetration portion 130, and when the piezoelectric vibration plate 11 performs the first displacement from the other side toward the one side, the first valve 310 closes the one opening of the penetration portion 130.

According to the above-described configuration, the displacement property is improved and the influence of air convection is securely reduced by employing the simple structure.

In any one of the above-described piezoelectric vibration plates 11, the central portion 110, the circumferential portion 120, and the coupling portion 140 are formed as one member, the central portion 110 and the base portion 100 have a rectangular shape in plan view, and the coupling portion 140 is formed on a corner portion of the central portion 110.

According to the above-described configuration, a vibration symmetry property is enhanced and improvement in durability and acoustic conversion efficiency is realized.

The piezoelectric vibration plate 11 according to another embodiment of the present invention includes: the base portion or base 100 that includes the central portion 110 and the circumferential portion 120 and has conductivity, the circumferential portion 120 being positioned on a periphery of the central portion 110; and the piezoelectric portion 150 that is provided on the central portion 110. Moreover, the central portion 110 performs bending vibration in a manner to reciprocate between both sides in a thickness direction of the base portion 100 when a voltage is applied to the piezoelectric portion 150. The base portion 100 includes at least one penetration portion 130 which is positioned between the central portion 110 and the circumferential portion 120, and at least one coupling portion 140 which couples the central portion 110 and the circumferential portion 120 with each other. The at least one penetration portion 130 has a slit shape whose slit width is greater than 0 mm and smaller than or equal to 0.1 mm in plan view of the base portion 100.

According to the above-described configuration, the durability and stability of the piezoelectric vibration plate is enhanced and favorable acoustic conversion efficiency is obtained.

The piezoelectric vibration plate 11 according to another embodiment of the present invention includes: the base portion 100 that includes the central portion 110 and the circumferential portion 120 and has conductivity, the circumferential portion 120 being positioned on a periphery of the central portion 110; and the piezoelectric portion 150 that is provided on the central portion 110. The central portion 110 performs bending vibration in a manner to reciprocate between both sides in a thickness direction of the base portion 100 when a voltage is applied to the piezoelectric portion 150. The base portion 100 includes at least one penetration portion 130 which is positioned between the central portion 110 and the circumferential portion 120, and at least one coupling portion 140 which couples the central portion 110 and the circumferential portion 120 with each other. The at least one penetration portion 130 includes the first valve 310 provided on a first opening 130*a* on a first side in the thickness direction of the base portion 100 and the second valve 320 provided on a second opening 130*b* on a second side in the thickness direction of the base portion 100.

According to the above-described configuration, the piezoelectric vibration plate exhibiting favorable acoustic conversion efficiency is obtained by employing the simple structure.

The piezoelectric sound generating component 1 includes: the piezoelectric vibration portion 10, which includes any one of the above-described piezoelectric vibration plates 11 and the mounting terminal 133 and mounting terminal 113 which are input output terminals for applying a voltage to the piezoelectric vibration plate 11; and the lower case 20 and upper case 30 that forms a case portion supporting the piezoelectric vibration portion 10.

According to the above-described configuration, improvement in durability of the piezoelectric sound generating component is realized and favorable acoustic conversion efficiency is obtained.

[Modification]

Figure 10A:
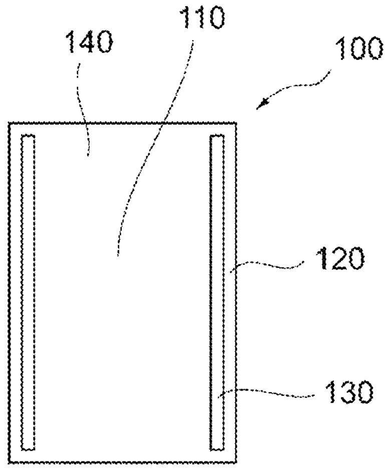
FIG. 10A is a drawing for explaining a modification of a base portion of the piezoelectric vibration plate.
Figure 10B:
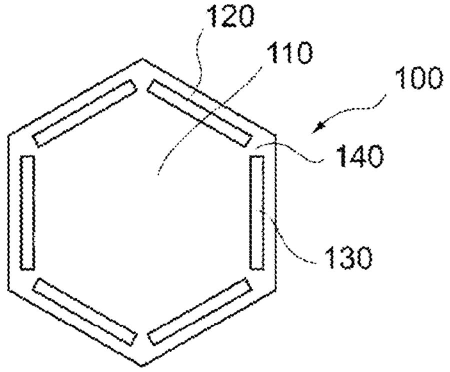
FIG. 10B is a drawing for explaining a modification of the base portion of the piezoelectric vibration plate.
Figure 10C:
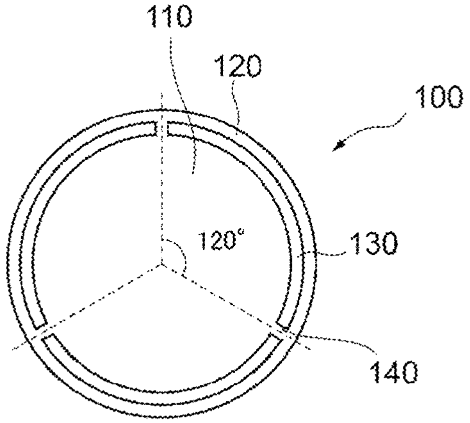
FIG. 10C is a drawing for explaining a modification of the base portion of the piezoelectric vibration plate.
Figure 11A:
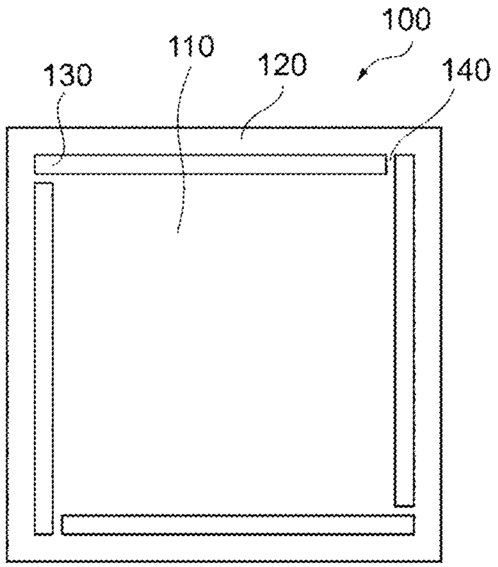
FIG. 11A is a drawing for explaining a modification of a penetration portion and a coupling portion of the piezoelectric vibration plate.
Figure 11B:
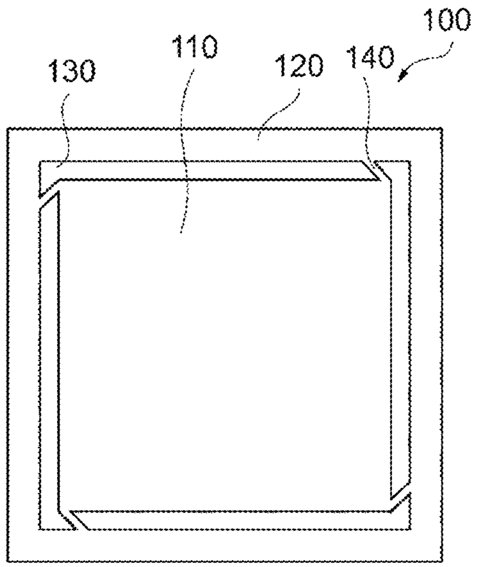
FIG. 11B is a drawing for explaining a modification of the penetration portion and the coupling portion of the piezoelectric vibration plate.
Figure 11C:
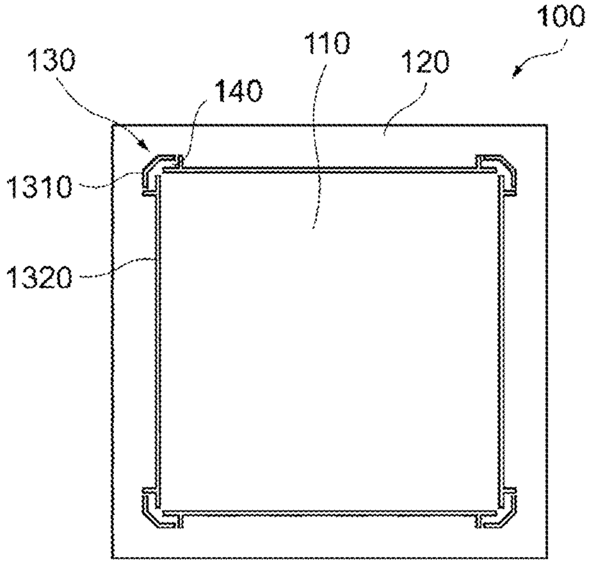
FIG. 11C is a drawing for explaining a modification of the penetration portion and the coupling portion of the piezoelectric vibration plate.

The present invention is not limited to the above-described embodiments and is applicable in a variously modified manner. Modifications according to the present invention will be first described below with reference to FIGS. 10A to 11C. FIGS. 10A to 10C are drawings for explaining modifications of the base portion 100 of the piezoelectric vibration plate 11. FIGS. 11A to 11C are drawings for explaining modifications of the penetration portion 130 and the coupling portion 140 of the piezoelectric vibration plate 11.

The base portion 100 and the central portion 110 have square shapes in the above-described embodiments. However, the base portion 100 and the central portion 110 may have various shapes such as a rectangular shape, a hexagonal shape (other polygonal shapes), and a circular shape, as illustrated in FIGS. 10A to 10C.

The base portion 100 has four penetration portions 130 in the above-described embodiments. However, the number of the penetration portions 130 is not limited to four, but the number may be two, three, or six, for example, as illustrated in FIGS. 10A to 10C. Also, an arbitrary number other than the above may be employed, namely, one penetration portion may be provided, for example. When a plurality of penetration portions 130 are employed, the penetration portions 130 may be arranged at equal intervals or at unequal intervals. However, the symmetry property of vibration distribution can be enhanced by arranging the plurality of penetration portions 130 at equal intervals. Here, when two penetration portions 130 are employed for the base portion 100 having a rectangular shape, these penetration portions 130 are preferably formed so that the longitudinal directions thereof are parallel to the longitudinal direction of the base portion 100. Such a configuration reduces inhibition with respect to displacement of the central portion 110.

The plan view shape of the penetration portion 130 is an isosceles trapezoid in the above-described embodiments. However, the shape of the penetration portion 130 is not limited to the isosceles trapezoid, but the shape may be an arc shape, a rectangular shape, an irregular shape, or a combined shape, for example, as illustrated in FIG. 10C and FIGS. 11A to 11C. In line with these shapes of the penetration portion 130, the coupling portion 140 may have various shapes. When the central portion 110 has a polygonal shape, the coupling portions 140 are preferably arranged around corner portions of the central portion 110 so as to reduce an influence from a vibration center of the central portion 110. Further, the coupling portions 140 are preferably arranged at equal intervals so as to enhance the symmetry property of vibration distribution.

The penetration portion 130 having a combined shape illustrated in FIG. 11C is now simply described. The penetration portion 130 according to the example of FIG. 11C includes a first penetration portion 1310 and a second penetration portion 1320. The plan view shape of the first penetration portion 1310 is a substantially V shape and the plan view shape of the second penetration portion 1320 is a substantially rectangular shape. In the example illustrated in FIG. 11C, four second penetration portions 1320 are formed between the central portion 110 and the circumferential portion 120 so that the longitudinal directions of the second penetration portions 1320 are respectively parallel to four sides of the central portion 110. Four first penetration portions 1310 are formed between the central portion 110 and the circumferential portion 120 so that the first penetration portions 1310 are positioned outside the corner portions of the central portion 110 and the second penetration portions 1320. Further, the first penetration portion 1310 is formed so that the length thereof in the longitudinal direction is larger than a distance between mutually-adjacent second penetration portions 1320 (e.g., width of a coupling portion).

According to the combination of the first penetration portions 1310 and second penetration portions 1320, the first penetration portion 1310 positioned outside the corner portion of the central portion 110 can reduce the inhibition with respect to the vibration of the central portion 110 caused by a coupling portion, which is between mutually-adjacent second penetration portions 1320 and positioned on the corner portion of the central portion 110. That is, because of this combination of the first penetration portions 1310 and second penetration portions 1320, the penetration portions 130 are provided along the whole circumference on the outside of the central portion 110 in a manner to surround the central portion 110. This suppresses the inhibition with respect to the vibration of the central portion 110 caused by a coupling portion, namely, a portion of the coupling portion 140 between mutually-adjacent second penetration portions 1320, being able to improve the displacement property of the central portion 110. In this configuration, the plan view shape of the coupling portion 140 is a substantially V shape that corresponds to the combination of the first penetration portion 1310 and second penetration portions 1320. That is, the coupling portion 140 has portions that are parallel to both mutually-adjacent sides of the central portion 110. Accordingly, a portion of the coupling portion 140 around the central portion 110 can be formed long. As a result, the displacement property of the central portion 110 can be sufficiently secured and durability of the coupling portion 140 can be enhanced.

That is, the base portion 100 of the piezoelectric vibration plate 11 having high durability and exhibiting a favorable displacement property is obtained by employing the penetration portions 130 having the combined shape.

The central portion 110, the circumferential portion 120, and the coupling portions 140 are integrally formed in the above-described embodiments. However, the central portion 110, the circumferential portion 120, and the coupling portions 140 may be separately formed.

The sealing material 200 entirely seals the penetration portion 130 in the above-described embodiments, but the sealing material 200 may partially seal the penetration portion 130. Further, the sealing material 200 may be a film.

In an exemplary aspect, the lower case 20 and the upper case 30 are made of liquid crystal polymer (LCP) in the above-described embodiments. However, the lower case 20 and the upper case 30 may be made of syndiotactic polystyrene (SPS), polyphenylene sulfide (PPS), polybutylene terephthalate (PBT), or the like, or may be made of ceramics. Further, the shapes of the lower case 20 and the upper case 30 are not limited to the square box shape, but may be a cylindrical shape or a polygonal prism shape, for example.

It should be noted that the embodiments described above are provided to facilitate the understanding of the present invention and are not intended for limiting the interpretation of the present invention. The present invention can be changed or improved without departing from the spirit, and the present invention includes equivalents thereof. That is, modifications obtained by making design changes to the embodiments as appropriate by a person skilled in the art are also included in the scope of the present invention as long as the modifications have the characteristics of the present invention. For example, the elements included in the embodiments, and the arrangement, the material, the condition, the shape, the size, and the like of the elements are not limited to those illustrated and can be changed as appropriate. In addition, it will be appreciated that the embodiments are examples and the structures illustrated by different embodiments can be partially replaced or combined, and these modifications are also included in the scope of the present invention as long as the characteristics of the present invention are included.

REFERENCE SIGNS LIST

1 piezoelectric sound generating component
10 piezoelectric vibration portion
20 lower case
30 upper case
11 piezoelectric vibration plate
12 spacer
13 terminal portion
100 base portion
110 central portion
120 circumferential portion
130 penetration portion
140 coupling portion
150 piezoelectric portion
200 sealing material
300 switching valve
310 first valve
320 second valve

The invention claimed is:

1. A piezoelectric vibration plate comprising:
a base that includes a central portion and a circumferential portion that is conductive and is positioned on a periphery of the central portion; and
a piezoelectric member disposed on the central portion,
wherein the central portion is configured to perform a bending vibration in a reciprocating manner in a thickness direction of the base when a voltage is applied to the piezoelectric member,
wherein the base includes at least one penetration portion that is positioned between the central portion and the circumferential portion, and at least one coupling portion that couples the central portion to the circumferential portion, and
wherein the at least one coupling portion is disposed at a farthest position from a center of the central portion at which a maximum displacement is generated in the bending vibration when the voltage is applied to the piezoelectric member.

2. The piezoelectric vibration plate according to claim 1, wherein the at least one penetration portion has a slit shape.

3. The piezoelectric vibration plate according to claim 2, wherein a slit width of the penetration portion is greater than 0.0 mm and less than or equal to 0.1 mm.

4. The piezoelectric vibration plate according to claim 1, wherein the at least one penetration portion includes a restriction portion that restricts an inflow of air existing in a first side in the thickness direction of the base to a second side in the thickness direction through the penetration portion and restricts an inflow of air existing in the second side in the thickness direction to the first side through the penetration portion.

5. The piezoelectric vibration plate according to claim 4, wherein the restriction portion comprises a sealing material that is elastically deformable and that seals at least a portion of the at least one penetration portion.

6. The piezoelectric vibration plate according to claim 5, wherein the sealing material comprises a resin.

7. The piezoelectric vibration plate according to claim 4, wherein the restriction portion comprises a switching valve that renders the at least one penetration portion openable and closeable.

8. The piezoelectric vibration plate according to claim 7, wherein the switching valve opens and closes the at least one penetration portion in response to the bending vibration of the piezoelectric vibration plate.

9. The piezoelectric vibration plate according to claim 8, wherein:

the at least one penetration portion includes a first opening on the first side in the thickness direction of the base and a second opening on the second side in the thickness direction of the base, the switching valve includes a first valve disposed on the first opening and a second valve disposed on the second opening, and the second valve closes the second opening of the penetration portion when the piezoelectric vibration plate performs a second displacement from the first side toward the second side, and the first valve closes the first opening of the penetration portion when the piezoelectric vibration plate performs a first displacement from the second side toward the first side.

10. The piezoelectric vibration plate according to claim 1, wherein the central portion, the circumferential portion, and the coupling portion are integrally formed as a single member.

11. The piezoelectric vibration plate according to claim 1, wherein the central portion and the base have a rectangular shape in a plan view thereof, and the coupling portion is disposed on a corner portion of the central portion.

12. A piezoelectric sound generating component comprising:

a piezoelectric vibration portion that includes the piezoelectric vibration plate according to claim 1 and an input output terminal configured to apply a voltage to the piezoelectric vibration plate; and a case constructed to support the piezoelectric vibration portion.

13. A piezoelectric vibration plate comprising:

a base that includes a central portion and a circumferential portion that is conductive and is positioned on a periphery of the central portion; and a piezoelectric member disposed on the central portion, wherein the central portion is configured to perform a bending vibration in a reciprocating manner in a thickness direction of the base when a voltage is applied to the piezoelectric member, wherein the base includes at least one penetration portion that is positioned between the central portion and the circumferential portion, and at least one coupling portion that couples the central portion to the circumferential portion, and wherein the at least one penetration portion has a slit shape with a slit width that is greater than 0.0 mm and less than or equal to 0.1 mm in a plan view of the base.

14. The piezoelectric vibration plate according to claim 13, wherein the central portion, the circumferential portion, and the coupling portion are integrally formed as a single member.

15. The piezoelectric vibration plate according to claim 13, wherein the central portion and the base have a rectangular shape in a plan view thereof, and the coupling portion is disposed on a corner portion of the central portion.

16. A piezoelectric sound generating component comprising:

a piezoelectric vibration portion that includes the piezoelectric vibration plate according to claim 13 and an input output terminal configured to apply a voltage to the piezoelectric vibration plate; and a case constructed to support the piezoelectric vibration portion.

17. A piezoelectric vibration plate comprising:

a base that includes a central portion and a circumferential portion that is conductive and that is positioned on a periphery of the central portion; and a piezoelectric member disposed on the central portion, wherein the central portion is configured to perform a bending vibration in a reciprocating manner in a thickness direction of the base when a voltage is applied to the piezoelectric member, wherein the base includes at least one penetration portion positioned between the central portion and the circumferential portion, and at least one coupling portion that couples the central portion to the circumferential portion, and wherein the at least one penetration portion includes a first valve disposed on a first opening on a first side in the thickness direction of the base and a second valve disposed on a second opening on a second side in the thickness direction of the base.

18. The piezoelectric vibration plate according to claim 17, wherein the central portion, the circumferential portion, and the coupling portion are integrally formed as a single member.

19. The piezoelectric vibration plate according to claim 17, wherein the central portion and the base have a rectangular shape in a plan view thereof, and the coupling portion is disposed on a corner portion of the central portion.

20. A piezoelectric sound generating component comprising:

a piezoelectric vibration portion that includes the piezoelectric vibration plate according to claim 17 and an input output terminal configured to apply a voltage to the piezoelectric vibration plate; and a case constructed to support the piezoelectric vibration portion.

* * * * *